United States Patent Office

3,446,869
Patented May 27, 1969

3,446,869
DEHYDROGENATION PROCESS AND CATALYST
George J. Nolan, Bartlesville, Okla., assignor to Phillips Petroleum Company, a corporation of Delaware
No Drawing. Filed July 14, 1966, Ser. No. 565,112
Int. Cl. C07c *11/22, 5/18*
U.S. Cl. 260—680                                                          10 Claims

ABSTRACT OF THE DISCLOSURE

Oxidative dehydrogenation of paraffinic and/or olefinic hydrocarbons with a catalyst consisting essentially of mixtures of at least 5 mol percent lead molybdate and at least 5 mol percent aluminum tungstate and/or cobalt tungstate.

---

This invention relates to dehydrogenation. In accordance with one aspect, this invention relates to a new dehydrogenation catalyst comprising mixtures of metal molybdates and tungstates. In accordance with a further aspect, this invention relates to the oxidative dehydrogenation of hydrocarbons in the presence of mixtures of lead molybdate and aluminum and/or cobalt tungstate. In accordance with a further aspect, this invention relates to a novel dehydrogenation catalyst consisting essentially of lead molybdate and aluminum and/or cobalt tungstate.

The usefulness of the dehydrogenation process in the preparation of olefins and diolefins for subsequent use in chemical synthesis, the production of high octane gasoline, the manufacture of synthetic rubber, and other such processes, is well known. There are many catalysts known for dehydrogenation. Among the best known for paraffin dehydrogenation is chromium oxide, and among the best known for olefin dehydrogenation is alkalized iron oxide, both of which are optionally supported or diluted with such materials as alumina, magnesia, and the like. However, these catalysts, as well as most dehydrogenation catalysts known in the art, are not interchangeable, i.e., the chromium oxide catalysts are not as active for olefin dehydrogenation and the iron oxide catalysts are less active for paraffin dehydrogenation than olefin dehydrogenation.

In the search for more efficient dehydrogenation processes, and for catalysts that will work in those processes, oxidative dehydrogenation has been extensively investigated because in theory it permits more extensive dehydrogenation at lower operating temperatures and, by reacting with the hydrogen removed from the hydrocarbon being dehydrogenated, furnishes at least part of the heat required for the dehydrogenating reaction. Unfortunately, however, the oxygen present in oxidative dehydrogenation processes tends to react with the organic material being dehydrogenated, with a consequent lowering of dehydrogenation efficiency.

In accordance with the invention, it has been found that certain metal tungstates and molybdates used as catalysts give high selectivity in the oxidative dehydrogenation of organic materials, particularly hydrocarbons, either paraffins or olefins.

Accordingly, it is an object of this invention to provide a new and improved method for dehydrogenating organic materials.

It is another object of this invention to provide a new catalyst for dehydrogenation.

Other aspects, objects and the several advantages of this invention will be apparent to those skilled in the art from a reading of this description and the appended claims.

According to the invention, dehydrogenatable organic materials, particularly hydrocarbons, including paraffins and olefins, are dehydrogenated by contacting with a catalyst consisting essentially of mixtures of lead molybdate and aluminum and/or cobalt tungstate.

The catalyst of the invention is broadly applicable to the dehydrogenation of dehydrogenatable organic compounds. More particularly, the invention is adapted for the dehydrogenation, and especially the oxidative dehydrogenation, of either paraffins or olefins. Other suitable feedstocks that can be dehydrogenated according to the invention include cycloparaffins, cycloolefins, and both aryl and heterocyclic compounds with alkyl or alkenyl substituents such as ethylbenzene and 2-methyl-5-ethylpyridine. The catalyst system of the invention is also useful for dehydrocyclization of aliphatic hydrocarbons having 6 or more carbon atoms in the chain.

Representative and specific examples of hydrocarbons that can be dehydrogenated according to the invention include: propylene, butane, n-butene, n-pentane, n-pentene, isopentene, octane, the octenes, the decanes and decenes, cyclobutene, cyclobutane, cyclopentane, cyclopentene, cyclohexene, cyclohexane, 3-butylcyclohexane, 3-isopentylcyclopentene, propylbenzene, n-butylbenzene, isobutylbenzene, hexylbenzene, 1-methyl-2-propylbenzene, 1-butyl-3-hexylbenzene, ethylpyridine, 2,3,4-trimethyl-5-ethylpyridine, 2-ethyl-5-hexylpyridine, and the like. Preferred reactions according to this invention are the formation of butenes from butane, 1,3-butadiene from butenes, pentenes from pentane, 1,3-pentadiene from pentenes, isoprene from the 2-methylbutenes, styrene from ethylbenzene, and 2-methyl-5-vinylpyridine from 2-methyl-5-ethylpyridine.

As indicated hereinbefore, it has been found that mixtures of lead molybdate and aluminum tungstate and/or cobalt tungstate give high selectivity in the oxidative dehydrogenation of either paraffinic or olefinic hydrocarbons. Specific catalysts that have been employed for dehydrogenation have been aluminum tungstate-lead molybdate, lead molybdate-cobalt tungstate, and lead molybdate-aluminum tungstate-cobalt tungstate.

The catalyst compositions of the invention can contain from 95 to 5 mol percent tungstate and 5 to 95 mol percent molybdate. The aluminum tungstate-lead molybdate catalyst will ordinarily contain from 40 to 5 mol percent aluminum tungstate and 60 to 95 mol percent lead molybdate with a preferred range of 20 to 5 mol percent aluminum tungstate and 80 to 95 mol percent lead molybdate. The ternary catalyst composition of the invention will ordinarily contain from 60–5–35 mol percent cobalt tungstate-aluminum tungstate-lead molybdate to 5–10–85 mol percent cobalt tungstate-aluminum tungstate-lead molybdate.

The catalyst can be used in the form of granules, of mechanically-formed pellets, or with a supporting or diluting material such as alumina present. The catalyst can be used in either a fixed or a fluidized bed. The catalyst can be prepared by any of the means known to the industry, such as by dry or wet mixing or milling of the catalyst ingredients, by precipitation of one of the ingredients in the presence of the other, and the like. Other methods of catalyst preparation that can be employed include coprecipitation and impregnation of one or more of the solid ingredients with aqueous or non-aqueous solution(s) of salt(s) of the additional ingredient(s).

One method of preparing the catalyst comprises first precipitating, say, lead molybdate by mixing a soluble salt of lead and a soluble molybdate salt. The lead molybdate is washed free of electrolyte and slurried with an aqueous solution of a soluble cobalt salt or aluminum salt or a mixture of the cobalt and aluminum salt. The cobalt and/or aluminum is precipitated as the tungstate by mixing with a soluble tungstate salt. The resulting precipitate is washed free of electrolyte, dried and calcined, say, by heating at a temperature in the range 500 to 1500° F., for a period of time ranging from 1 to 50 hours.

Oxygen for the oxidative dehydrogenation reaction can be used as such, or can be used in the form of air, of a flue gas containing residual oxygen, and the like. Diluents such as nitrogen, steam, and the like can be present.

The operating conditions for this invention can vary widely but will generally include a temperature from about 700 to about 1300, preferably from about 800 to about 1200° F., a pressure from about 0.05 to about 50, preferably from about 0.1 to about 25, p.s.i.a., and an oxygen to hydrocarbon volume ratio of from about 0.1/1 to about 3/1, preferably from about 0.5/1 to about 2/1.

The hydrocarbon space rate (volumes hydrocarbon vapor/ volume or catalyst/hour, 32° F., 15 p.s.i.a.) can be from about 50 to about 5000, preferably from about 100 to about 2500, still more preferably from about 200 to about 1000.

The presence of oxygen during the dehydrogenation reaction permits extended operating periods but when catalyst regeneration is necessary, such can be effected simply by terminating the hydrocarbon flow for a sufficient length of time while continuing the flow of oxygen or oxygen-containing gas at the same or higher rate as desired. The dehydrogenation process is resumed simply by restarting the hydrocarbon flow.

The process of this invention is ordinarily carried out by forming a mixture, preferably preheated, of the hydrocarbon and oxygen or oxygen-containing stream and passing this mixture over the catalyst at the desired temperature. Recycle of unconverted hydrocarbon can be employed is desired; however, the conversion rates and selectivity of this invention are generally sufficiently high to justify a single step, i.e., single pass, operation, if, for example, the product streams can be used without separation steps in a subsequent operation, such as polymerization.

EXAMPLE I

The catalyst used in this example contained 90 mol percent lead molybdate and 10 mol percent aluminum tungstate, and was made by the following procedure:

(1) Lead molybdate was prepared by reacting aqueous solutions of lead nitrate and sodium molybdate, washing the resulting precipitate with dilute aqueous ammonium nitrate solution and then with deionized water to remove soluble salts;

(2) The lead molybdate precipitate from step (1) was slurried in an aqueous aluminum nitrate solution, and aluminum tungstate was precipitated by addition of an aqueous sodium tungstate solution. The mixed precipitates were washed with dilute aqueous ammonium nitrate solution and then with deionized water, dried, and granulated to 20–28 mesh (Tyler).

This catalyst was used to dehydrogenate either normal butane or butene-2 at atmospheric pressure and 1100° F., using air as the oxygen source:

| Hydrocarbon dehydrogenated | Space rate, v./v./hr. | | Conv., mol percent | Selectivity, mol percent | | |
|---|---|---|---|---|---|---|
| | Hydrocarbon | $O_2$ | | To $C_4H_8$ | To $C_4H_6$ | To $C_4H_8$+$C_4H_6$ |
| n-Butane | 33 | 33 | 25.9 | 29.7 | 41.0 | 70.0 |
| n-Butane | 100 | 100 | 15.8 | 48.0 | 29.7 | 77.7 |
| Butene-2 | 100 | 100 | 65.5 | | 80.7 | |
| | 600 | 600 | 27.2 | | 91.5 | |

From the above data, it can be seen that a substantial conversion of butene-2 to butadiene was effected in a single pass, and that selectivity for that product was quite high.

EXAMPLE II

Ten catalyst compositions of the invention prepared in the same manner as described in Example I were utilized for dehydrogenation by passing a mixture of butenes and air over a fixed bed of 20–28 mesh granules of catalyst at atmospheric pressure and 1100° F. catalyst temperature. In step (2) of the catalyst preparation procedure, the aqueous nitrate solution contained aluminum nitrate and/or cobalt nitrate.

| Catalyst composition, mol percent | | | | GHSV, v./v./hr. | | Butenes conv., mol percent | Butadiene | |
|---|---|---|---|---|---|---|---|---|
| Tungstate | | Molybdate, Pb | | | | | Yield, percent | Selectivity, mol percent |
| Co | Al | | | Butenes | Air | | | |
| 60 | 0 | 40 | | 100 | 500 | 60.9 | 44.3 | 72.8 |
| | | | | 600 | 3,000 | 61.9 | 47.7 | 77.1 |
| 40 | 0 | 60 | | 100 | 500 | 66.3 | 45.6 | 68.9 |
| | | | | 600 | 3,000 | 52.5 | 37.6 | 71.6 |
| 20 | 0 | 80 | | 100 | 500 | 57.4 | 37.9 | 66.1 |
| | | | | 600 | 3,000 | 35.7 | 29.6 | 83.0 |
| | 20 | 80 | | 100 | 500 | 43.9 | 34.9 | 79.6 |
| | | | | 600 | 3,000 | 10.6 | 9.2 | 87.3 |
| | 10 | 90 | | 100 | 500 | 65.5 | 52.9 | 80.7 |
| | | | | 600 | 3,000 | 27.2 | 24.9 | 91.5 |
| 10 | 5 | 85 | | 100 | 500 | 64.6 | 50.5 | 78.2 |
| | | | | 600 | 3,000 | 33.8 | 30.7 | 89.5 |
| 10 | 10 | 80 | | 100 | 500 | 60.8 | 47.6 | 78.3 |
| | | | | 600 | 3,000 | 33.0 | 29.4 | 89.2 |
| 20 | 10 | 70 | | 100 | 500 | 58.9 | 46.3 | 78.7 |
| | | | | 600 | 3,000 | 22.7 | 20.3 | 89.6 |
| 40 | 5 | 55 | | 100 | 500 | 59.9 | 43.0 | 71.8 |
| | | | | 600 | 3,000 | 61.6 | 47.9 | 77.8 |
| 60 | 5 | 35 | | 100 | 500 | 61.2 | 38.8 | 63.0 |
| | | | | 600 | 3,000 | 59.3 | 46.4 | 78.3 |

From the above data, it can be seen that a substantial conversion to butadiene was effected in a single pass, and that selectivity for that product was quite high.

Reasonable variation and modification are possible within the scope of the foregoing disclosure and the appended claims to the invention, the essence of which is that the dehydrogenation, and particularly oxidative dehydrogenation, of dehydrogenatable materials is carried out in an improved manner by effecting the dehydrogenation in the presence of a novel catalyst consisting essentially of mixtures of lead molybdate and aluminum tungstate and/or cobalt tungstate.

I claim:
1. A catalyst consisting essentially of mixtures of at least 5 mol percent lead molybdate and at least 5 mol per- cent of at least one member of the group consisting of aluminum tungstate and cobalt tungstate.

2. A composition according to claim 1 wherein the mixtures contain from 5–95 mol percent molybdate and 95–5 mol percent tungstate.

3. A catalyst according to claim 1 wherein the mixture is cobalt tungstate and lead molybdate.

4. A catalyst according to claim 1 wherein the mixture is aluminum tungstate and lead molybdate and wherein the mixture contains 40–5 mol percent aluminum tungstate and 60–95 mol percent lead molybdate.

5. A catalyst according to claim 1 wherein the mixture is cobalt tungstate-aluminum tungstate-lead molybdate and the mixture contains 60–5–35 mol percent to 5–10–85 mol percent of the recited components, respectively.

6. A catalyst according to claim 1 wherein the mixture is associated with a support.

7. A process for producing unsaturated compounds which comprises contacting a dehydrogenatable organic compound with a catalyst consisting essentially of mixtures of at least 5 mol percent lead molybdate and at least 5 mol percent of at least one member of the group consisting of aluminum tungstate and cobalt tungstate in the presence of oxygen under oxidative dehydrogenation conditions.

8. A process according to claim 7 wherein said dehydrogenatable organic compound is at least one hydrocarbon selected from paraffins and olefins.

9. A process according to claim 8 wherein the temperature is in the range of from 700 to about 1300° F. and the oxygen to hydrocarbon ratio is in the range of about 0.1:1 to about 3:1, and wherein said hydrocarbon contains from 4 to 5 carbon atoms per molecule and the contacting is effected under vapor phase conditions.

10. A process according to claim 9 wherein hydrocarbon feed is a mixture of butenes and the contacting is effected at a temperature in the range 800–1200° F. and in the presence of a quantity of air sufficient to cause an oxygen to butene ratio in the range of from about 0.5:1 to about 2:1.

References Cited

UNITED STATES PATENTS

| 2,326,258 | 8/1943 | Schmidt | 260—680 |
| 3,200,141 | 8/1965 | Milberger | 260—465.3 |
| 3,365,482 | 1/1968 | Khoobiar | 200—465.3 |

DELBERT E. GANTZ, *Primary Examiner.*

G. E. SCHMITKONS, *Assistant Examiner.*

U.S. Cl. X.R.

252—469, 472; 260—465.9, 669, 683.3